(12) United States Patent
Sundgren et al.

(10) Patent No.: US 7,591,453 B2
(45) Date of Patent: Sep. 22, 2009

(54) STABILIZER AND A METHOD OF MANUFACTURING THE SAME

(75) Inventors: Anders Sundgren, Sunderbyn (SE); Göran Berglund, Gammelstad (SE); Mats Lindberg, Luleå (SE)

(73) Assignee: Accra Teknik AB, Ojebyn (SE)

( * ) Notice: Subject to any disclaimer, the term of this patent is extended or adjusted under 35 U.S.C. 154(b) by 40 days.

(21) Appl. No.: 10/514,908

(22) PCT Filed: May 13, 2003

(86) PCT No.: PCT/SE03/00774

§ 371 (c)(1),
(2), (4) Date: Jan. 5, 2005

(87) PCT Pub. No.: WO03/097389

PCT Pub. Date: Nov. 27, 2003

(65) Prior Publication Data

US 2006/0076750 A1    Apr. 13, 2006

(30) Foreign Application Priority Data

May 16, 2002  (SE) .................................... 0201476

(51) Int. Cl.
*B60G 11/18* (2006.01)
*F16F 1/14* (2006.01)

(52) U.S. Cl. .......................... 267/273; 267/188; 267/154

(58) Field of Classification Search ................ 267/273, 267/188, 154; 280/124.106–124.107; 29/897.2, 29/447, 90.7, 508, 515–517; 72/53, 371, 72/342.94, 342.7, 342.8
See application file for complete search history.

(56) References Cited

U.S. PATENT DOCUMENTS 3,426,414 A * 2/1969 Iseki et al. ..................... 492/27

(Continued)

FOREIGN PATENT DOCUMENTS

DE    3112252 A1    10/1982

(Continued)

OTHER PUBLICATIONS

Database WPI, Week 199632, Derwent Publications Ltd., London, GB; AN 1996-318125 & JP 8142632 (NHK Spring Co.Ltd), Jun. 4, 1996, figures 1,2 abstract.

*Primary Examiner*—Robert A Siconolfi
*Assistant Examiner*—Vu Q Nguyen
(74) *Attorney, Agent, or Firm*—Ware, Fressola, Van der Sluys & Adolphson LLP

(57) ABSTRACT

A stabilizer (1) used in a vehicle is provided by a tubular element (2) with a middle section (3) and two end sections (4a and 4b), where the end sections (4a and 4b) is bent at an angle relative the middle section (3) so that the stabilizer (1) attains a U-shape. Section surfaces perpendicular to the longitudinal/center axes (A3 and/or A4) of the tubular element at the middle section (3) and/or the end sections (4a and 4b) are of a shape where one of two vectors (V1 and V2) in the plane of a section surface is longer than the other, both vectors originating from the center of gravity of the section surface (P), extending to the periphery of the tubular element and being at an angle relative to each other. A method of manufacturing a stabilizer is also disclosed.

25 Claims, 3 Drawing Sheets

U.S. PATENT DOCUMENTS

| | | | | |
|---|---|---|---|---|
| 3,540,714 A | * | 11/1970 | Mueller | 267/154 |
| 4,138,141 A | * | 2/1979 | Andersen | 267/273 |
| 4,429,899 A | | 2/1984 | Ohno et al. | |
| 4,533,402 A | * | 8/1985 | Ohno et al. | 148/566 |
| 4,854,150 A | * | 8/1989 | Brown et al. | 72/369 |
| 4,869,480 A | * | 9/1989 | Beutin et al. | 267/273 |
| 5,507,518 A | * | 4/1996 | Nakahara et al. | 280/124.166 |
| 5,598,735 A | * | 2/1997 | Saito et al. | 72/369 |
| 5,810,338 A | * | 9/1998 | Koenig et al. | 267/273 |
| 6,196,530 B1 | * | 3/2001 | Muhr et al. | 267/273 |
| 6,318,710 B1 | * | 11/2001 | Anderson et al. | 267/273 |
| 6,682,610 B1 | * | 1/2004 | Inoue | 148/519 |

FOREIGN PATENT DOCUMENTS

| | | |
|---|---|---|
| FR | 2795681 A1 | 1/2001 |
| JP | 56-120905 U | 9/1981 |
| JP | 57-074808 U | 5/1982 |
| JP | 01-161906 U | 11/1989 |
| JP | 08-142632 A | 6/1996 |
| JP | 8142632 A | 6/1996 |
| JP | 09-058246 A | 3/1997 |
| JP | 2000-024737 U | 1/2000 |

* cited by examiner

STABILIZER AND A METHOD OF MANUFACTURING THE SAME

BACKGROUND OF THE INVENTION

1. Technical Field

This invention concerns a stabilizer used in a vehicle and a method of manufacturing the same.

2. Description of the Background Art

The stabilizer is used for limiting the body roll of vehicle. This body roll arises from the centrifugal forces that act on a vehicle while in motion, above all when cornering. A stabilizer is a device that links the movement of the springs found on the two wheels of one and the same axle of a vehicle. The stabilizer works so that when the load on the two wheels is uneven, the one with the highest load will be given a stiffer suspension while the one with the lowest load will be given a softer suspension. This possibility of controlling the suspension of a pair of wheels enables the body roll of the vehicle to be reduced.

A stabilizer comprises a rod or tube with essentially straight middle section and angled ends. Each end is fastened to its respective wheel suspension. At or near its middle section, the stabilizer is normally fastened to the body of the vehicle in such a way that it is allowed to turn around its longitudinal axis while the means of fastening offers damping.

All vehicle manufacturers strive to limit the weight of the component parts. One problem with a stabilizer manufactured in steel is that it has a high weight. This problem has been solved by using tubing instead. A tube with the same dimensions as a rod has a lower weight thanks to less mass but at the same time has a lower moment of inertia and resistance to torsion and is therefore not as strong or possesses the same characteristics.

Space is often the factor that controls the design of various components used in the manufacture of vehicles and a stabilizer must also be limited in size. To be able to use a tube instead of a rod, the tube must have a greater diameter in order to possess the same moment of inertia as a rod, which often makes the design too bulky.

The object of this invention is to offer a stabilizer with low weight and high strength and a simple and cost-cutting method of manufacturing the same.

One embodiment of the invention with respect to both the stabilizer and the method, plus further advantages of the invention and alternative designs/methods will be described below with references made to the figures.

DETAILED DESCRIPTION OF THE INVENTION

Figure 1:
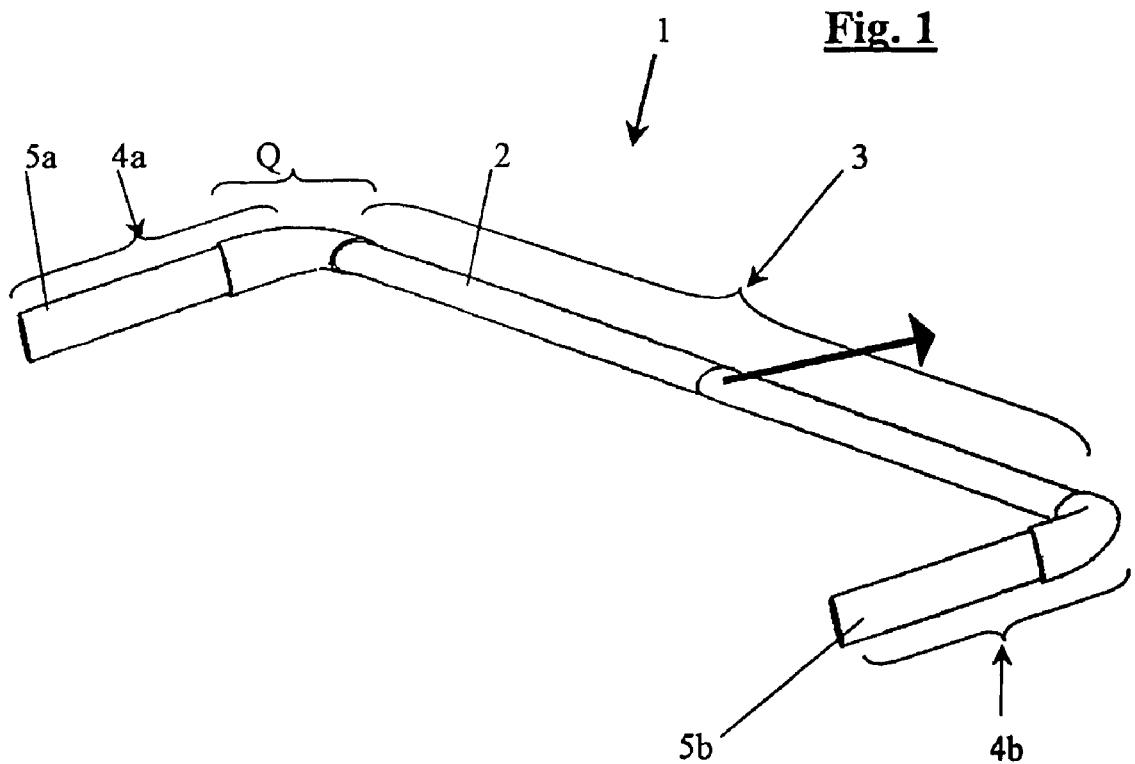
FIG. 1 is a perspective view of a stabilizer according to the invention.

FIG. 1 shows a stabilizer according to the invention. The stabilizer 1 comprises a tubular element 2 with a middle section 3 and two end sections 4a and 4b and is essentially U-shaped.

The stabilizer 1 is mounted underneath a vehicle (not shown in the figure) in such a way that the longitudinal axis of the middle section A3 (FIG. 2) follows the front end of the vehicle transverse to the normal direction of travel of the vehicle (indicated with an arrow in FIG. 1). The end sections 4a and 4b point principally backward in relation to the normal direction of travel of the vehicle. The description of the stabilizer and the method uses directions and locations based on a stabilizer mounted on a vehicle.

The outer end 5a of one end section 4a is fastened to the wheel suspension (not shown in the figure) intended for one of two wheels at each end of the vehicle axle. The outer end 5b of the other end section 4b is fastened to the wheel suspension for the other wheel. At or near its straight middle section 3, the stabilizer 1 is normally fastened to the body of the vehicle in such a way that it is allowed to turn around its longitudinal axis while the means of fastening offers damping (not shown in the figure).

FIG. 3-6 show imagined cross sections through the stabilizer perpendicular to the longitudinal plane of the stabilizer that create section surfaces of a shape where one of two vectors V1 and V2 in the plane of a section surface is longer than the other, both vectors originating from the center of gravity of the section surface P, extending to the periphery of the tubular element and being at an angle relative to each other. Vectors V1 and V2 are principally at 90° to each other, one on the X-axis and one on the Y-axis. The origin coincides with the center of gravity P of the various section surfaces. The section surfaces continue in some direction and their shape is oval. In this document, an oval shape means all shapes that are not round, even irregular shapes such as bean shapes, are included. The section surfaces are oval shaped both at the middle section 3 of the stabilizer and at its end sections 4a and 4b.

An oval-shaped tube provides greater resistance to torsion than a circular tube with the same outside dimensions. This means that a rod of diameter 15 mm with a certain resistance to torsion can be substituted with a tube of oval cross section with dimensions 25*15 t=1.0, where t=wall thickness of tube with retained or equivalent resistance to torsion and lower weight. The properties of an oval tube are similar to that of a plank with respect to bending. An oval tube is easy to bend downward when it is lying so that the longest vector in the oval section surface is horizontal but difficult to bend downward when the tube is lying with the longest vector in the oval section surface vertical. This is the equivalent of a plank lying flat and on its edge respectively. In view of the discussion above, the section surfaces of the stabilizer can also be rectangular. This shape provides the same characteristics as an oval stabilizer.

The stabilizer end sections 4a and 4b are twisted in relation to the middle section 3. The end sections 4a and 4b are twisted around their longitudinal axes/center axes A4, a quarter of a turn to be exact, and also in relation to the longitudinal axis/center axis of the middle section A3. In the middle section 3, the tubular element 2 is oriented so that the longest vector in the oval section surface is horizontal. In the end sections 4a and 4b, the tubular element 2 is oriented so that the longest vector in an oval section surface in these sections is vertical.

The stabilizer can also be made so that in the middle section 3, the tubular element 2 is oriented so that the longest vector in the oval section surface is vertical. In the end sections 4a and 4b, the tubular element 2 is oriented so that the longest vector in an oval section surface in these sections is horizontal.

The stabilizer end sections 4a and 4b are located at an angle in relation to the middle section 3, as is already known. The end sections 4a and 4b are, based on their longitudinal axes A4, angled/bent at an angle of α in relation to the longitudinal axis of the middle section A3. The angle/bend itself is done in the area Q where the end sections 4a and 4b are twisted in relation to the middle section 3.

As stated earlier, the size a stabilizer can be is limited. The space in which the stabilizer is mounted contains other vehicle components that directly limit the space allowed for the stabilizer. Most often, it is the vertical size, the height, of the stabilizers middle section and the horizontal size, the breadth, of the end sections that must be limited. That the tube element 2 is oval and lying/horizontal in the middle section 3 and the end sections 4a and 4b are twisted in relation to the middle section 3 and thereby oval and standing/vertical mean that the stabilizer 1 has an appearance that fulfils these requirements. The middle section 3 is relatively low and flat and extends principally along a horizontal axis, while the end sections 4a and 4b are narrow and thin and extend principally along a vertical axis.

A stabilizer with other demands on size can also be included in the idea of the invention. A stabilizer made so that the tubular element 2 in the middle section 3 is oriented so that the longest vector in an oval section surface in this section 3 is in a vertical plane and the tubular element 2 in the end sections 4a and 4b is oriented so that the longest vector in an oval section surface in these sections is in a horizontal plane naturally also fulfills other demands on size.

It is also necessary for different parts of the stabilizer to have different degrees of stiffness, above all in different directions. It is already known to use rods of different thickness in different sections along the rod and it is already known to use tubes with different wall thickness in different parts along the tube where the different sections will have varying properties with regard to ductility and strength. However, these designs usually mean extra weight and/or variations in volume, often in areas where this is not desirable. The design according to this invention offers a stabilizer that at its ends is rigid so that the attachment of the stabilizer retains its shape.

The stabilizer 1 is manufactured of metal, hardened boron steel for example.

Figure 2:
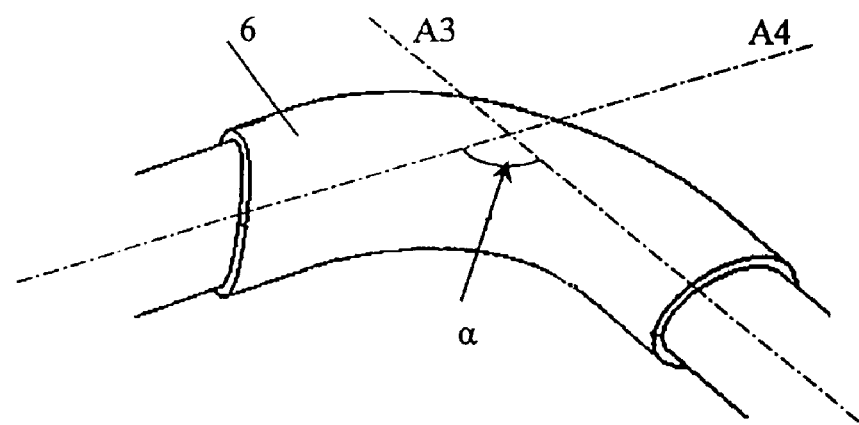
FIG. 2 is a perspective view of one embodiment of a section of the stabilizer in accordance with the invention.
Figure 3:
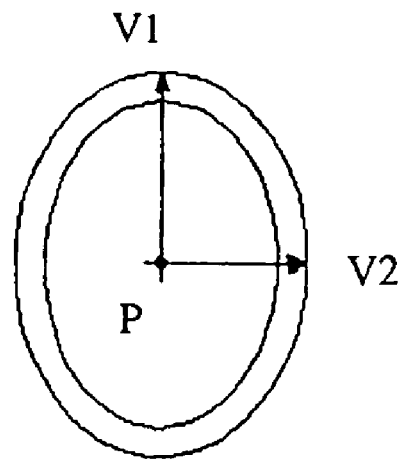
FIGS. 3-6 show examples of the various types of cross-sections of the stabilizer, which are all included in the idea of the invention.
Figure 4:
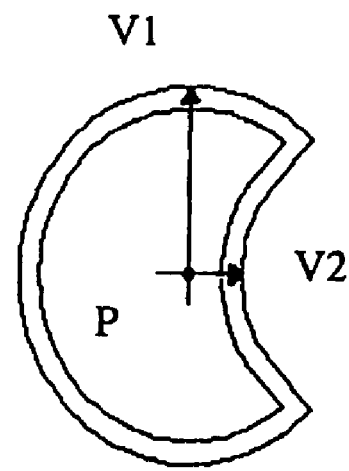
Figure 5:
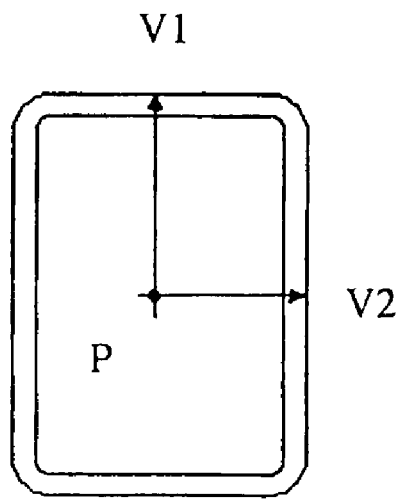
Figure 6:
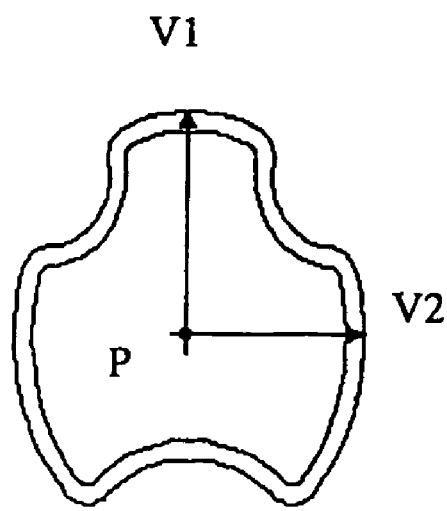

The stabilizer 1 can be fitted with a piece of metal/tube, a sleeve, outside the tubular element where it is both twisted and bent (see FIG. 2). The sleeve 6 increases the material thickness and thereby reduces the risk of adverse deformation such as cracks and folds when the stabilizer 1 is manufactured. The sleeve 6 can be made of the same material as the rest of the stabilizer 1 and have the same shape as the tubular element 2.

The invention also concerns a method of manufacturing a stabilizer. The final stabilizer 1 comprises a tubular element 2 divided into a middle section 3 and two end sections 4a and 4b and with this method, each end section 4a and 4b is bent at an angle relative the middle section 3 so that the stabilizer 1 attains a U-shape.

A tubular element of a shape with section surfaces perpendicular to the longitudinal axis of the tubular element, both in the middle section 3 and in the end sections 4a and 4b, where one of two vectors V1 and V2 in the plane of a section surface is longer than the other, both vectors V1 and V2 originating from the center of gravity P of the section surface, extending to the periphery of the tubular element and being at an angle relative to each other is used. Vectors V1 and V2 are located at an angle of 90° to each other.

The tubular element 2 is manufactured in metal and is shaped to form a stabilizer 1 in a thermoforming process. The material is consequently shaped after being heated. The section surfaces of the tubular element are principally oval but can also be rectangular. This shape provides the same characteristics as an oval tubular element. An oval tubular element has the advantage of being easier to bend/twist.

Shaping a tubular element 2 into a finished stabilizer 1 follows the procedure below:

The tubular element end sections 4a and 4b are twisted in relation to the middle section 3, more precisely one quarter of a turn. The end sections 4a and 4b are twisted so that the side of the tubular element 2 that is to constitute the front of the stabilizer, the front surface of the stabilizer with respect to the direction of travel, forms the top of the end sections. The end sections 4a and 4b are turned so that a section surface in the tubular element 2, perpendicular to the middle section's longitudinal axis A3, has a horizontal oval shape and a section surface perpendicular to the longitudinal axes A4 of the end sections has a vertical oval shape.

The end sections 4a and 4b are bent/angled in one section Q of the tubular element 2 where the end sections 4a and 4b are twisted in relation to the middle section 3. The twisting and bending can be done simultaneously or, alternatively, the twisting can be done before the bending.

Before shaping, a piece of material/tube, a sleeve 6, is placed around the section of the tubular element 2 where the twisting and/or bending is to be done. The sleeve 6 is shrink-fitted onto the tubular element 2. The sleeve 6 increases the material thickness and thereby reduces the risk of adverse deformation such as cracks and folds when the stabilizer 1 is manufactured.

Instead of increasing the amount of material to avoid undesirable deformation, the section of the tubular element 2 where twisting and/or bending is to take place can be mechanically processed. This mechanical process can be shot peening. Shot peening means that small particles are shot against the surface of the material to generate stress on the surface, which in turn prevents the occurrence of cracks.

Figure 7:
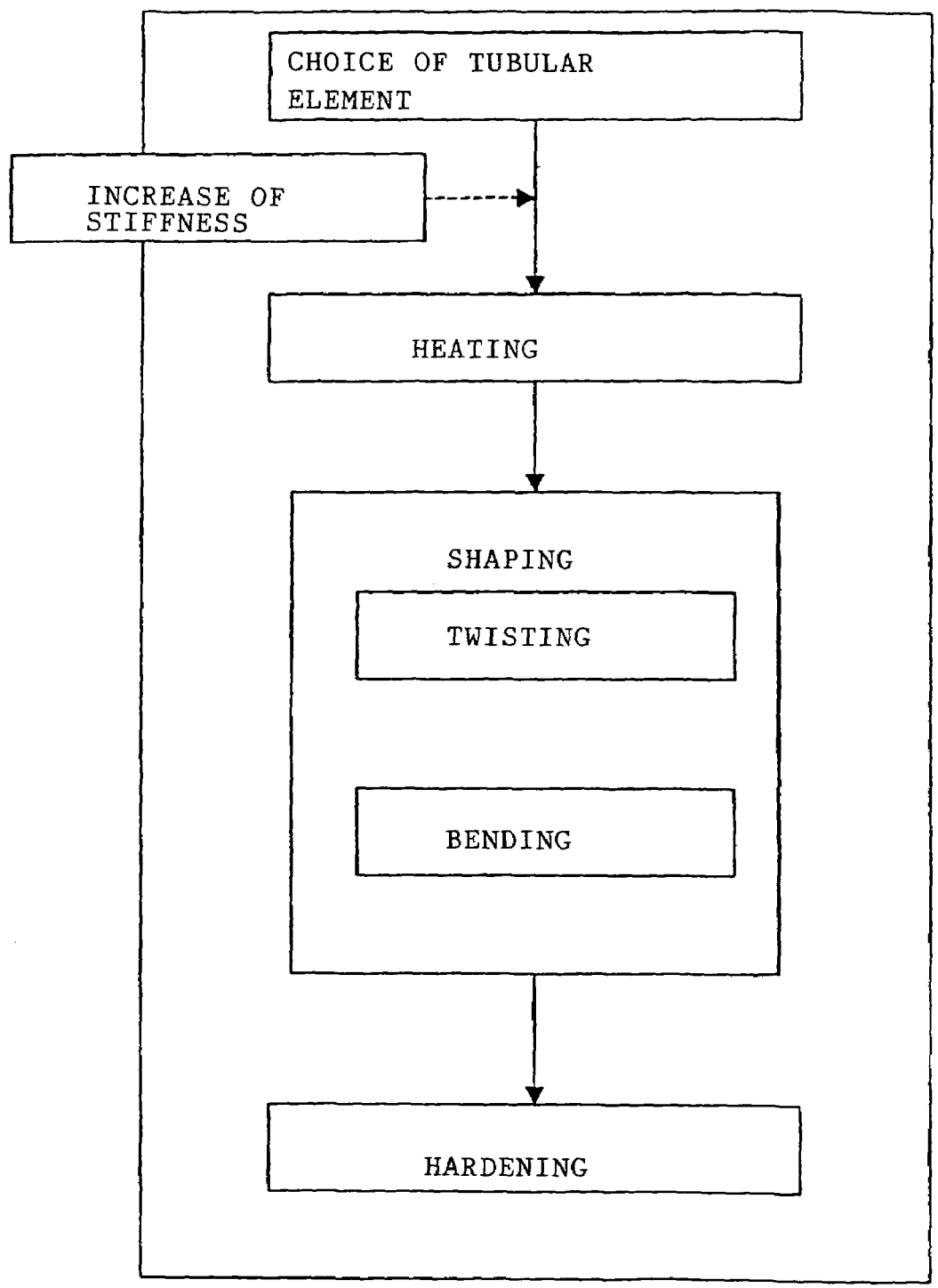
FIG. 7 is a flow diagram for the method according to the invention.

Shaping is followed by hardening, where the finished stabilizer 1 is cooled, principally with water, while it is still in the final shaping tool. The method steps according to the invention are illustrated in the flow diagram of FIG. 7.

This description of the invention is not to be regarded as a limitation but only as an example to facilitate comprehension of the invention. Adaptations of different parts in relation to other component parts, choice of material, size adjustments, shape adjustments and everything else that is evident or presents itself immediately to a technical specialist can naturally be carried out within the idea of the invention.

What is claimed is:

1. Stabilizer comprising a tubular element with a middle tubular section and two end tubular sections, said tubular element is tubular throughout its entire length, where the end tubular sections are angled in relation to the middle tubular section so that the stabilizer attains a U-shape, the end tubular sections are also twisted in relation to the middle tubular section, each cross-section of the middle tubular section and end tubular sections taken perpendicular to the longitudinal center axes thereof have two imaginary vectors in the plane of each cross-section, the two imaginary vectors originating from a center of gravity of their cross-section and extending to a periphery of their cross-section at an angle to each other, one of the two vectors of each cross-section of the middle tubular section and the end tubular sections is longer than the other, further including a sleeve applied outside the tubular element at each section that is bent and twisted, each sleeve being bent and twisted along with each section that is bent and twisted.

2. Stabilizer according to claim 1, wherein the end tubular sections are twisted one quarter of a turn.

3. Stabilizer according to claim 1, wherein the end tubular sections are twisted so that a side of the tubular element that constitutes a front of the middle tubular section constitutes a top of the end tubular sections.

4. Stabilizer according to claim 1, wherein the end tubular sections are angled in one section of the tubular element, where the end tubular sections are also twisted in relation to the middle tubular section.

5. Stabilizer according to claim 1, wherein the two vectors are located principally at 90° to each other.

6. Stabilizer according to claim 1, wherein the at least one of the middle tubular sections and the end tubular sections is oval.

7. Stabilizer according to claim 1, wherein the at least one of the middle tubular sections and the end tubular sections is rectangular.

8. Stabilizer according to claim 1, wherein the middle tubular section and the end tubular sections have one of the two vectors of each cross-section longer than the other, the middle tubular section has a lying form with the longest vector in each of its cross-sections on a horizontal plane, and the end tubular sections have a standing form with the longest vector in each of its cross-sections on a vertical plane.

9. Stabilizer according to claim 1, wherein the middle tubular section and the end tubular sections have one of the two vectors of each cross-section longer than the other, the middle tubular section has a standing form with the longest vector in each of its cross-sections on a vertical plane, and the end tubular sections having a lying form with the longest vector in each of its cross-sections on a horizontal plane.

10. Stabilizer according to claim 1, wherein the stabilizer is manufactured in metal.

11. A method of manufacturing a stabilizer comprising the steps of:
   (a) providing a tubular element with a middle tubular section and two end tubular sections, said tubular element is tubular throughout its entire length, each cross-section of the tubular element taken perpendicular to a longitudinal center axis have two imaginary vectors in the plane of each cross-section, the two imaginary vectors originating from a center of gravity of their cross-section and extending to a periphery of their cross-section at an angle to each other, one of the two vectors of each cross-section is longer than the other;
   (b) placing at least one sleeve around each section of the tubular element that is to be twisted and bent in later bending and twisting steps;
   (c) bending the end tubular sections so each are angled in relation to the middle tubular section so that the stabilizer attains a U-shape, the at least one sleeve on the end tubular sections being bent along with the end tubular sections; and
   (d) twisting the end tubular sections in relation to the middle tubular section, the at least one sleeve on the end tubular sections being twisted along with the end tubular sections.

12. Method of manufacturing a stabilizer according to claim 11, wherein the end tubular sections are twisted one quarter of a turn.

13. Method of manufacturing a stabilizer according to claim 11, wherein the end tubular sections are twisted so that a side of the tubular element that constitutes a front of the stabilizer constitutes a top of the end tubular sections.

14. Method of manufacturing a stabilizer according to claim 11, wherein the end tubular sections are twisted at a section of the tubular element where the end tubular sections are angled in relation to the middle tubular section.

15. Method of manufacturing a stabilizer according to claim 11, wherein the twisting and bending are accomplished simultaneously.

16. Method of manufacturing a stabilizer according to claim 11, wherein the twisting is accomplished before the bending.

17. Method of manufacturing a stabilizer according to claim 11, wherein the vectors are at an angle of 90° to each other.

18. Method of manufacturing a stabilizer according to claim 11, wherein the tubular element is oval.

19. Method of manufacturing a stabilizer according to claim 11, wherein the tubular element is rectangular.

20. Method of manufacturing a stabilizer according to claim 11, wherein the tubular element is made of metal.

21. Method of manufacturing a stabilizer according to claim 11, further including the step of heating the tubular element before at least one of the twisting and bending steps.

22. Method of manufacturing a stabilizer according to claim 11, wherein the sleeve is shrink-fitted.

23. Method of manufacturing a stabilizer according to claim 11, before the bending and twisting steps, further including the step of shot-peening each section of the tubular element that is to be bent and twisted.

24. Method of manufacturing a stabilizer according to claim 11, after the bending and twisting steps, further including the step of hardening.

25. Method of manufacturing a stabilizer according to claim 24, wherein the stabilizer is placed in a shaping tool during the hardening step.

* * * * *

UNITED STATES PATENT AND TRADEMARK OFFICE
CERTIFICATE OF CORRECTION

PATENT NO. : 7,591,453 B2
APPLICATION NO. : 10/514908
DATED : September 22, 2009
INVENTOR(S) : Sundgren et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 86 days.

Signed and Sealed this

Twenty-first Day of September, 2010

David J. Kappos
*Director of the United States Patent and Trademark Office*